F. H. Wright,
Wind Wheel,
NO. 1,287 - X
Patented Apr. 5, 1810.
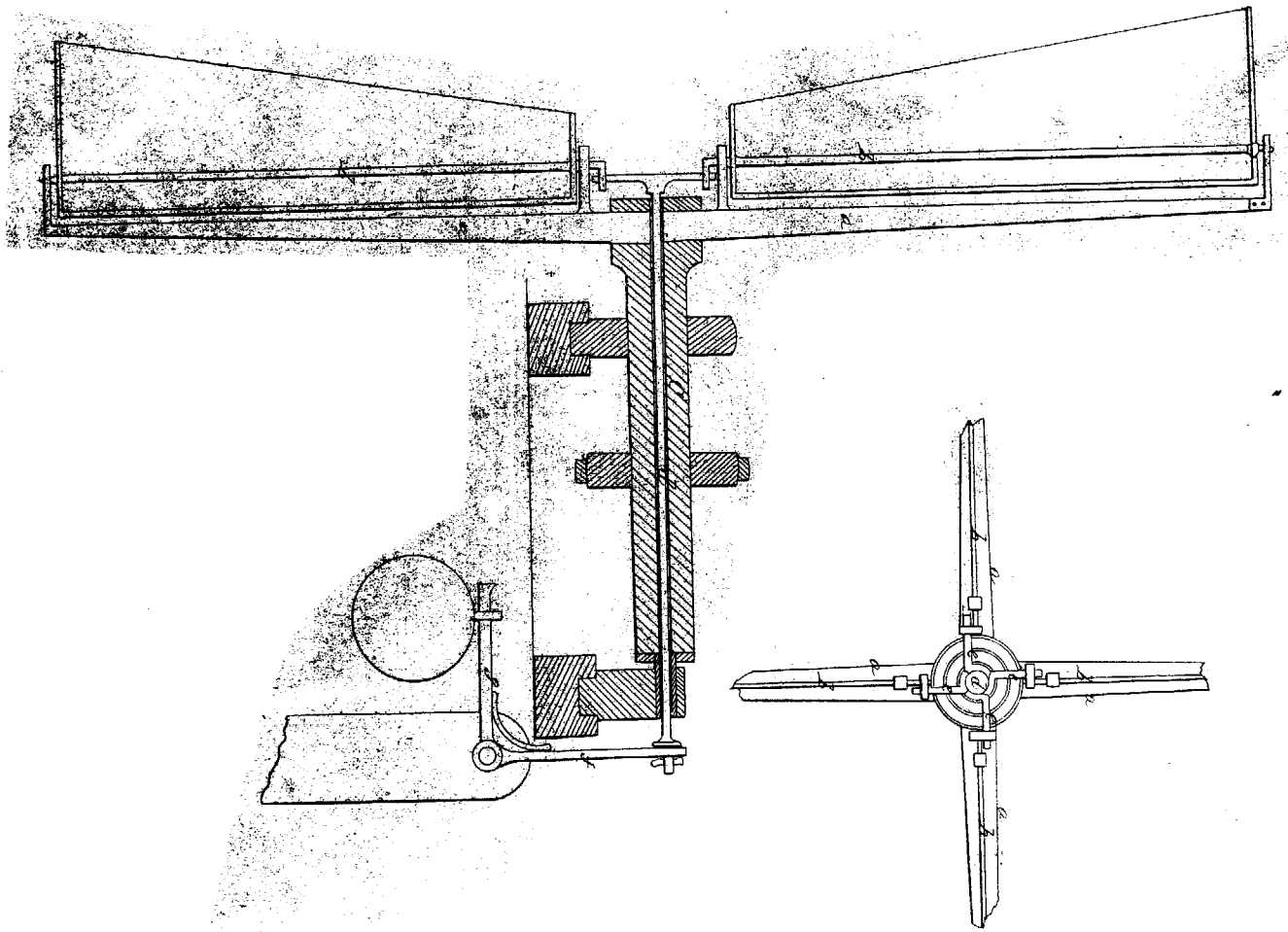

1287X [illegible] Apr 25 1810 [illegible]

Russel H. Wright April 25, 1810

Letters Patent.

The Schedule referred to in these Letters Patent and making part of the same containing a description in the words of the said Russel Wright himself of his "Regulated Wind Mill".

The invention of this improvement called the Regulated Wind Mill, consists in constructing the arms of the Windmill on which the wind sails are put in such a manner as to have the mill Regulate itself. so that let the wind hard or gently blow, the Mill will go steady and Regular. To effect this, the four arms on which the sails are fixed leaving the greatest half of said sails to the windward of said arms are made of round iron or hard wood & fitted with boxes on the main arms, so as to turn about 1/8 round. by which means the angle of the wind sails is lessened in proportion to the increasing strength of the wind. and as said angle lessens the less the wind effects the said sails. The round arms enter at the shaft of the wind wheel and the ends of them form short arms at right angles with the said other parts of them. The main shaft of the wind wheel is bored through it to a tube to admit an iron shaft, called the centre shaft. On the outer end of this iron centre shaft is permanently fixed the horns, made of iron. These horns cross each other at the centre at right angles, and are welded together. The ends of said horns go into the ends of said short arms and when said horns and the short arms of the said round arms on which the sails are put, and close up to the end of the wind wheel shaft which lies horizontally the said sails will be then turned ~~horizontally the said sails will be then turned~~ edgeways to the wind, and the wind wheel will then stop. To turn the said sails to the wind so as to have the wheel turned by it, a lever is fixed at the inner end of said iron center shaft. by which said shaft (on the outer end of which said horns are fixed) is drawn endways so as to carry said horns out, and by these means to turn the sails to a proper angle with the wind. With this said lever is connected proper works to contain a sufficient weight which constantly presses said centre iron shaft outward so as to keep the said sails in a proper angle with the wind. in order to have the mill go as fast as may be wanted. If the wind blows harder, the said sails lessen their angle by forcing inward said Horns and centre shaft. which operation raises said weight and the mill thereby goes regular. When the wind blows moderately but not hard enough to raise said weight the sails will then be kept at their greatest angle to the winds by said weight. so that by this improvement the wind mill may be made to go if the wind blows when wanted, & also stopped as easy, and as regular as a water mill.

[illegible]

while splitting the leather. A [illegible] square Roller with [illegible] fitted to it, is placed onto the frame round which the leather is drawn while splitting. The said which are moveable on said square roller so as to prevent the Leather from stretching. A pair of nippers [illegible] made [illegible] is fixed with proper Leather straps to this roller. These nippers take hold of the leather & by turning said conical Roller they haul it through and as it is split, it then is wound round this roller. On one end of this conical roller a contrate cast iron wheel two feet in diameter is firmly fixed. This contrate wheel is turned by a pinion to which a crank is fixed by which the whole machine is made to operate. Another roller is also fixed on the frame so as to keep the leather while splitting up close to the surface of the cylinder. The roller under the edge of the knife and which forms the gauge is made of cast iron about five inch in diameter and is accurately turned. The other Rollers are made of hard wood. The sides of Neats leather as well as sheep and other skins, may be split by this machine w.d be wet so as to make two skins out of one Phinehas Dow Enrd.
[illegible]

Witnesses
John Fairbanks
Josiah Loring

Drawing made by [illegible]

1805 103